US007140240B2

(12) United States Patent
Gustafson et al.

(10) Patent No.: US 7,140,240 B2
(45) Date of Patent: Nov. 28, 2006

(54) ELECTRIC ENGINE START SYSTEM WITH INSPECTION MODE

(75) Inventors: James R. Gustafson, Granby, MA (US); Kenneth Marks, Southwick, MA (US); Douglas A. Parsons, Canton, CT (US); Gregory I. Rozman, Rockford, IL (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/872,625

(22) Filed: Jun. 21, 2004

(65) Prior Publication Data

US 2005/0284214 A1 Dec. 29, 2005

(51) Int. Cl.
*G01M 15/00* (2006.01)

(52) U.S. Cl. ....................... 73/116; 73/117.2; 73/117.3; 73/118.1

(58) Field of Classification Search .................. 73/116, 73/117.2, 118.1, 117.3, 117
See application file for complete search history.

(56) References Cited

U.S. PATENT DOCUMENTS 3,151,452 A * 10/1964 Bunger et al. ................ 60/787
4,949,021 A 8/1990 Rozman et al.
5,029,263 A 7/1991 Rozman
5,055,764 A * 10/1991 Rozman et al. ............... 322/10
6,018,233 A 1/2000 Glennon
6,037,752 A 3/2000 Glennon
6,470,258 B1 * 10/2002 Leamy et al. ............... 701/100

OTHER PUBLICATIONS

U.S. Appl. No. 10/893,462, filed Jul. 16, 2004.
U.S. Appl. No. 10/881,309, filed Jun. 30, 2004.
U.S. Appl. No. 10/806,635, filed Mar. 23, 2004.

* cited by examiner

*Primary Examiner*—Edward Lefkowitz
*Assistant Examiner*—Freddie Kirkland, III
(74) *Attorney, Agent, or Firm*—Carlson, Gaskey & Olds

(57) ABSTRACT

A turbine engine inspection arrangement utilizes a motor that is otherwise utilized for starting the engine. An inspection interface allows for communicating with a motor controller to operate the motor in an inspection mode. During inspection, the motor moves the components of the engine very slowly or in an incremental fashion to facilitate visual inspection of the engine components, such as the turbine blades.

28 Claims, 3 Drawing Sheets

ELECTRIC ENGINE START SYSTEM WITH INSPECTION MODE

FIELD OF THE INVENTION

This invention generally relates to electric engine start systems. More particularly, this invention relates to inspecting an engine using an electric start system in an inspection mode.

DESCRIPTION OF THE RELATED ART

Electric engine start systems are known. Such systems typically include an electric motor that is used to rotate components of an engine during a starting procedure. Gas turbine engines are one type of engine where such start procedures are necessary.

Gas turbine engines typically require periodic inspection of engine components to determine whether maintenance is required. Typical inspection techniques are manual. A mechanic or technician needs to remove a cover on an accessory gear box to expose a wrenching point so that the individual can manually turn the engine rotor. At the same time, another individual can look through an inspection port with a boroscope to observe the turbine blades for wear, for example. The time required to remove the cover and expose the gear box and the fact that two individuals are needed to complete an inspection within a reasonable time (one to turn the rotor and another to inspect the blades) makes the conventional approach expensive. Moreover, opening the gear box presents the possibility that contamination of the gear box may occur.

Another approach has been to utilize a separate inspection motor for turning the engine components during inspection. Such a separate motor must be attached to a point on the engine gear box similar to the manual wrenching point. This technique requires removing the gear box cover and installing the motor. The extra motor, associated time and labor makes the procedure undesirably complicated and expensive.

There is a need for an improved way to inspect gas turbine engine components such as the turbine blades. This invention addresses that need and avoids the shortcomings and drawbacks of the conventional techniques.

SUMMARY OF THE INVENTION

In general terms, this invention is an engine inspecting arrangement that utilizes a motor that is normally used to start the engine to move the engine during an inspection procedure.

One example engine inspection system includes an electric motor that is associated with the turbine engine for starting the engine. A motor controller controls movement of the motor for starting the engine. An inspection interface that is manually controllable communicates with the motor controller to cause the motor controller to move the motor in a manner that results in movement of portions of the engine for inspection purposes.

In one example, the inspection interface includes a transmitter that transmits at least one wireless signal to the motor controller to operate the motor in an inspection mode. In another example, the motor controller includes an input port that can be selectively coupled to the inspection interface. In one example, when the inspection interface is connected to the motor controller input port, the motor controller switches into an inspection mode.

One method of inspecting a turbine engine includes communicating a desired engine position to a motor controller that controls a motor otherwise used for starting the engine. Moving the motor using the motor controller responsive to the communicated desired engine position results in moving a portion of the engine for inspection purposes.

The various features and advantages of this invention will become apparent to those skilled in the art from the following description of currently preferred embodiments. The drawings that accompany the detailed description can be briefly described as follows.

DETAILED DESCRIPTION OF THE PREFERRED EMBODIMENT

Figure 1:
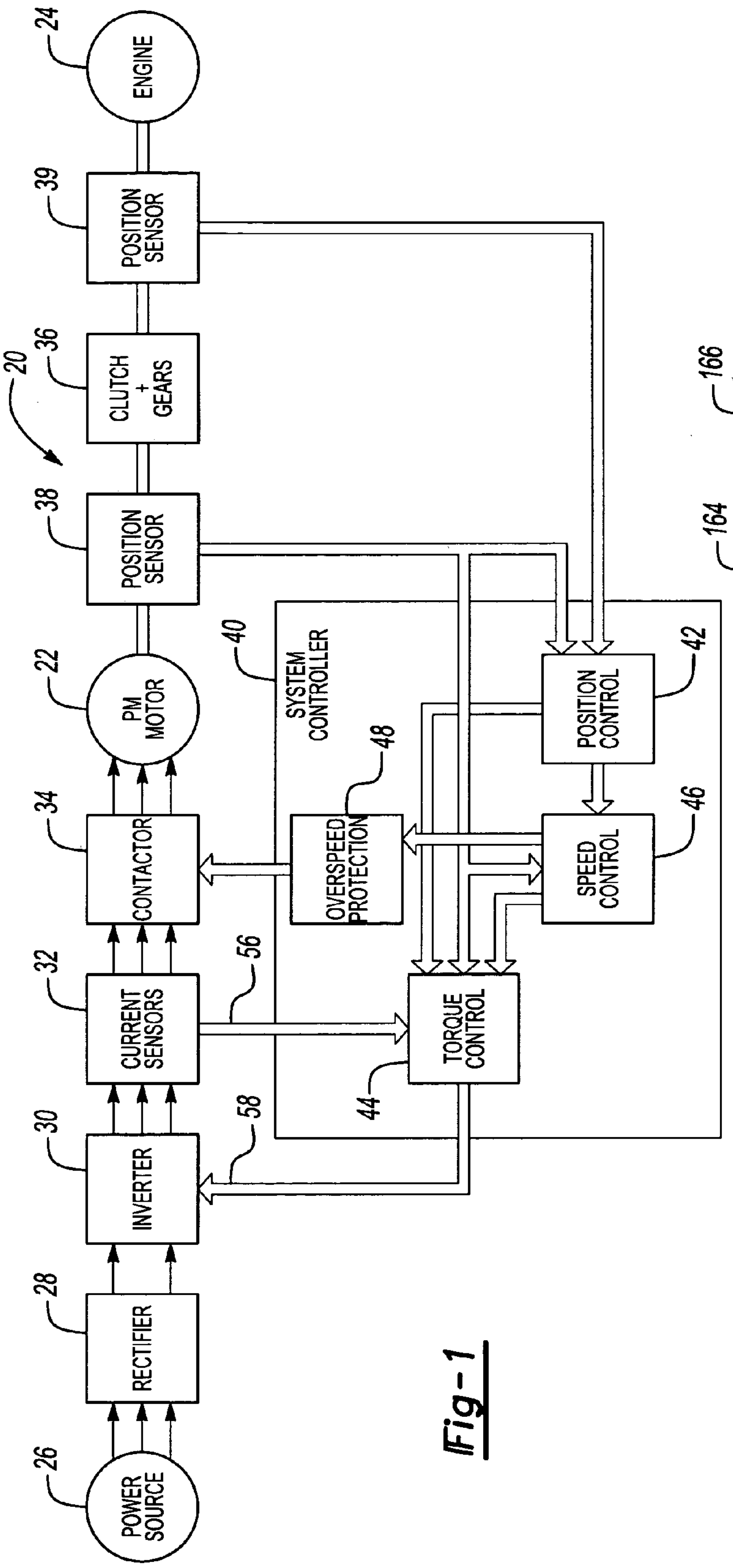
FIG. 1 schematically illustrates an electric engine starting system designed according to an example embodiment of this invention.

FIG. 1 schematically illustrates an electric start system 20 having an electric motor 22 for starting an engine 24. In one example, the motor 22 is a permanent magnet motor and the engine 24 is a gas turbine engine. The motor 22 receives power from a power source or grid 26 through a rectifier 28 that is in series with an inverter 30, both of which may operate in a known manner. Current sensors 32 and a contactor 34 are provided between the inverter 30 and the motor 22 for control and inverter protection, respectively. The current sensors 32 and contactor 34 operate in a known manner.

A conventional clutch and gear box arrangement 36 couple the motor 22 to the engine 24 in a manner that allows the motor 22 to be used for rotating portions of the engine 24 during a starting procedure, for example.

A position sensor 38 provides motor position information to a controller 40 that controls operation of the motor 22. In one example, the position sensor 38 comprises at least one low resolution position sensor such as a Hall effect sensor and provides output signals with a plurality of phases that equals the number of phases of the motor 22. The controller 40 utilizes output signals from the position sensor 38 for controlling the motor 22.

Another position sensor 39 is associated with the engine 24. In one example, the position sensor 39 is a magnetic pick up device associated with a shaft of the engine 24. The position sensor 39 provides position information regarding the engine 24 to the controller 40.

The example controller 40 includes a plurality of modules, which are schematically shown in FIG. 1. It should be noted that the different "modules" are not necessarily different hardware or software components but there may be functional overlap between portions of them for a controller designed according to an embodiment of this invention. The divisions shown in FIG. 1, for example, are for discussion purposes.

A position control module 42 receives the signals from the position sensors 38, 39 or both, and provides output to a torque control module 44 and a speed control module 46. The torque control module 44 and speed control module 46 operate under most circumstances to control the motor 22 for starting the engine 24 or for generating power by the motor 22 when the engine 24 is fully operational, for example. Known techniques may be used for these portions of the motor control accomplished by the controller 40. In one example, the controller 40 utilizes square wave output signals from the position sensors in a unique manner to provide motor control. The details of such a motor control strategy are disclosed in the co-pending application having Ser. No. 10/881,309 file on Jun. 30, 2004.

The controller 40 also includes an over speed protection module 48 that operates the contactor 34 responsive to information from the speed control module 46 to protect the inverter 30, for example, from an over voltage situation when the motor 22 rotates at high speeds as a result of a broken clutch 36, for example.

Under normal conditions, the controller 40 operates the motor 22 as required or useful for operation of the engine 24. In an example shown in FIG. 2, the controller 40 also operates the motor 22 in an inspection mode. An inspection arrangement 50 includes a boroscope 52 that is utilized with an inspection port 54 of the engine 24 in a known manner to visually inspect the condition of the turbine blades, for example. The controller 40 includes an inspection control module 56 for controlling the motor 22 during an inspection procedure. The speed with which the engine components are rotated during an inspection procedure is much slower than normal engine operation speeds. The inspection control module 56 cooperates with other portions of the controller 40 such as the torque control module 44 to cause the motor 22 to move in a manner that causes movement of appropriate portions of the engine 24 to complete an inspection procedure. Automating the movement of the engine components in this manner allows for easier and more efficient inspection compared to arrangements that require manual rotation of the engine components or connecting a separate motor to the clutch and gear box arrangement 36 for purposes of inspection.

Figure 2:
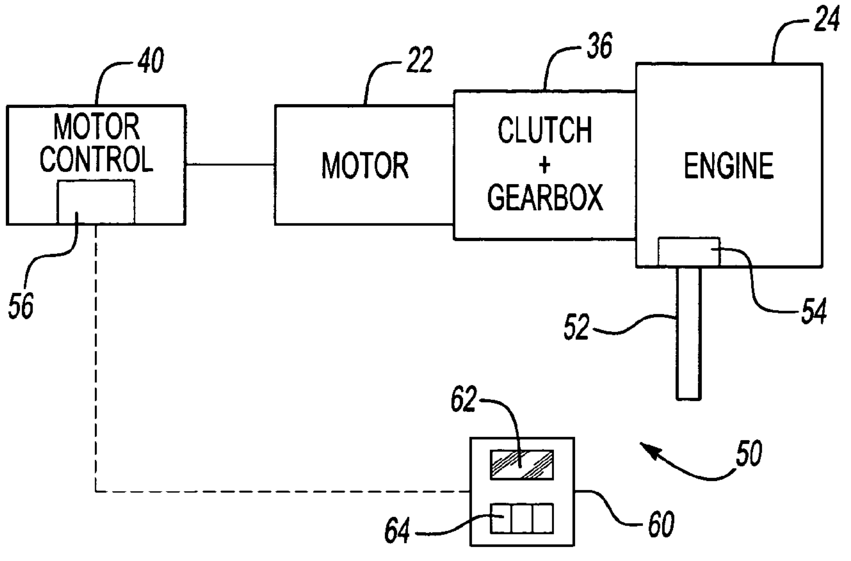
FIG. 2 schematically illustrates selected portions of the embodiment of FIG. 1 and an example inspection arrangement.

The example embodiment of FIG. 2 includes an inspection interface 60 having a display 62 that provides information regarding motor speed, position and instructions for interfacing with the controller 40, for example. An input device 64 allows for an individual to manually manipulate the inspection interface 60 to provide signals to the controller 40 indicating a desired motor operation for moving the engine 24 in a manner that facilitates completing an inspection operation. The type of input device 64 on the inspection interface 60 may vary and can include such known devices as key pads, joy sticks, touch screens, etc. Those skilled in the art who have the benefit of this description will realize what type of input device will best meet the needs of their particular situation.

Figure 3:
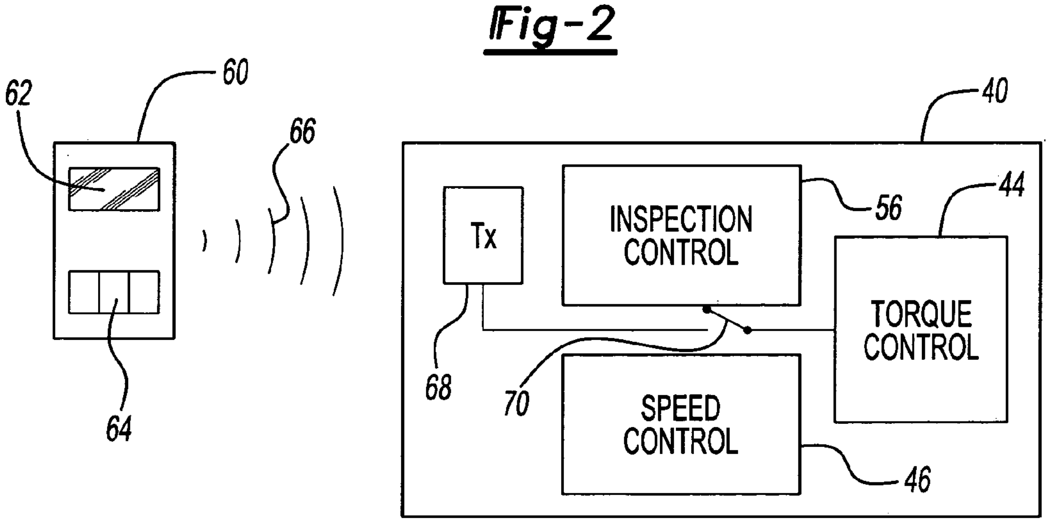
FIG. 3 schematically illustrates selected portions of the embodiment of FIG. 2 in a first configuration.

FIG. 3 schematically illustrates an embodiment where the inspection interface 60 communicates with the controller 40 using a wirelessly transmitted signal 66. In this example, the controller 40 includes a transceiver 68 for wirelessly communicating with the inspection interface 60. Infrared or radio frequency signals, for example, may be used with known techniques for accomplishing such communication. In this example, the torque control module 44 utilizes information from the position sensors 38, 39 or both for normal motor control and inspection mode motor control. In this example, the torque control module 44 receives input from the speed control module 46 for normal motor operation. The inspection control module 56 provides information to the torque control module 44 for controlling the motor 22 during inspection.

In this example, the transceiver 68 operates a switch 70 that effectively switches the input to the torque control module 44 from the speed control module 46 to the inspection control module 56 responsive to an appropriate command issued by the inspection interface 60. For example, an individual wishing to begin an inspection mode may make an appropriate input using the inspection interface 60. This generates a command received by the transceiver 68, that results in switching the controller 40 into inspection mode. The switch 70 is schematically illustrated and need not comprise a mechanical switch but could be software, for example.

Figure 4:
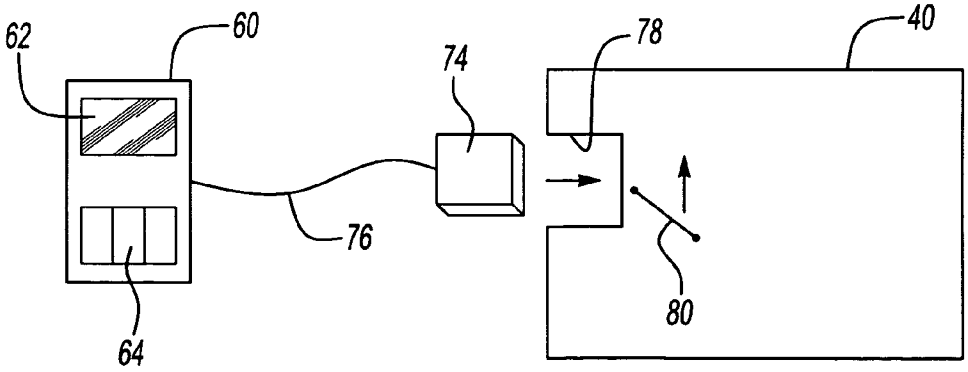
FIG. 4 schematically illustrates an alternative arrangement of selected portions of the embodiment of FIG. 2.

FIG. 4 illustrates another example embodiment where the inspection interface 60 includes a connector 74 that is hardwired with a conductor 76 to the inspection interface 60. The connector 74 is adapted to be received in an input port 78 associated with the controller 40. In one example, the mechanical connection between the connector 74 and the input port 78 operates a switch 80 for switching the controller between normal motor control and inspection mode motor control. The presence of the connector 74 in this example provides an indication to the controller 40 that an individual desires to inspect the engine 24 and the controller 40 operates responsive to commands provided through the inspection interface 60 to facilitate engine inspection.

The example embodiments provide the ability for a single technician or mechanic to perform an engine inspection in an efficient manner. In one example, the inspection interface 60 is a relatively small, handheld device that allows the individual to be in a position to view the engine components through the boroscope 52 while manipulating the input device 64 to cause the desired amount of engine movement for an accurate inspection.

Figure 5:
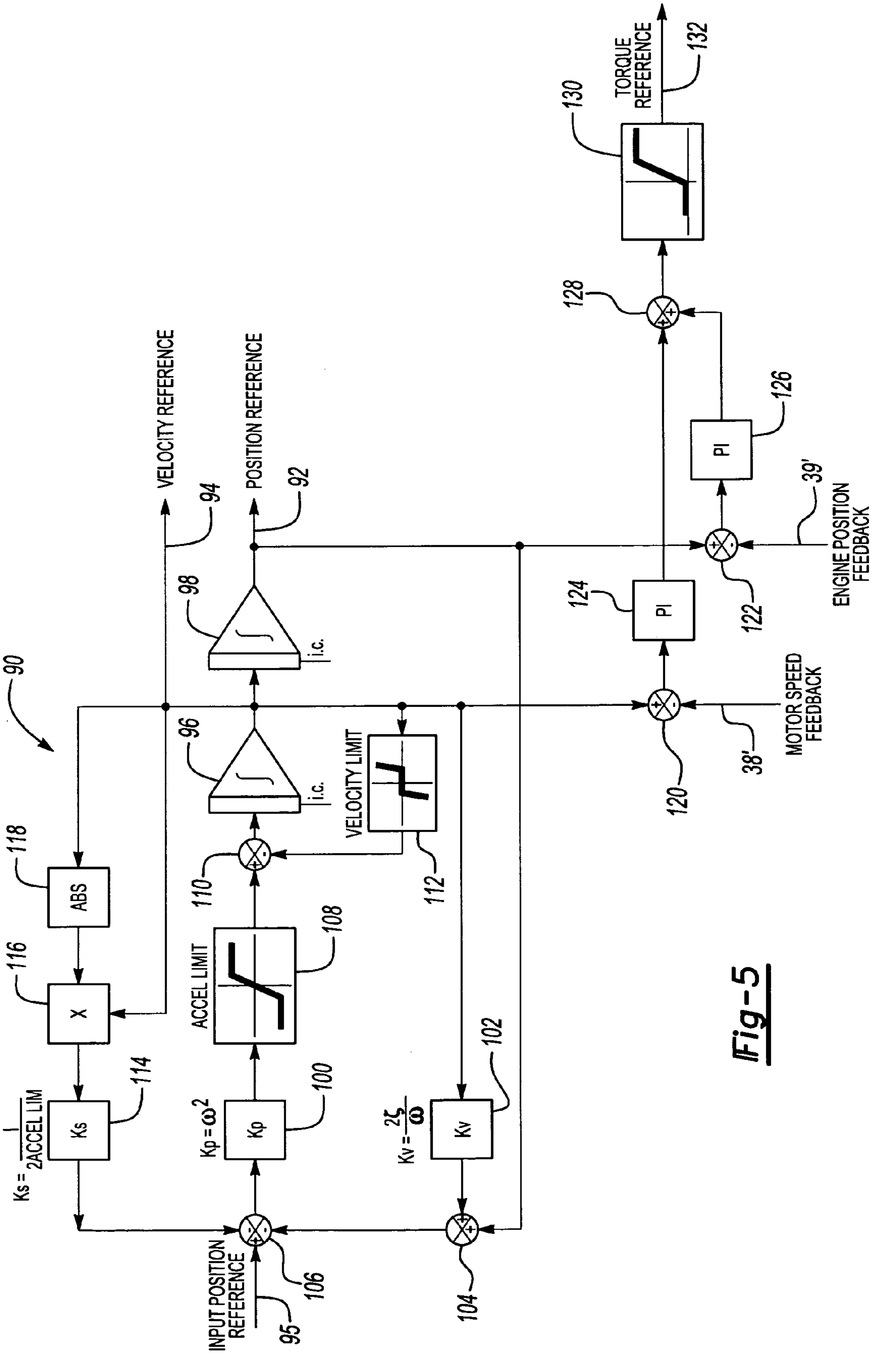
FIG. 5 schematically illustrates a portion of an example motor controller arrangement.

FIG. 5 schematically illustrates one example implementation of using the motor controller 40 for controlling the motor 22 during an inspection procedure.

FIG. 5 schematically illustrates a control module 90 that provides a position reference signal 92 to the torque control module 44 of the controller 40 during an inspection procedure. The control module 90 also provides a velocity reference signal 94 for controlling the speed of the motor 22. The control module 90 operates responsive to an input command 95 that is received from the inspection interface 60.

In this example, the control module 90 contains a second order dynamic block having two integrators 96 and 98. The purpose of the command generator is to provide a position and speed reference signals 92 and 94 from the input command reference 95 to the torque control module 44 that is the used to move the motor to a commanded position or at a commanded speed as indicated by the input signal 95.

The dynamic behavior of the control module 90 is specified by gains Kp100 and Kv102. The Kp gain 100 is selected based on a desirable frequency bandwidth of the control module 90. The Kv gain 102 is selected based on a desirable frequency bandwidth and damping ratio. The output of the Kv gain block 102 is provided to a summer 104 that is then provided to a summer 106 that also receives the input command 95. The output of the summer 106 is provided to the Kp gain block 100. The output of the Kp gain block 100 is provided to a saturation function block 108 with an output provided to another summer 110.

The integrator 96 receives the output from the summer 110. A feedback loop of the integrator 96 includes a non-linear dead zone block 112 that provides a velocity limit. The non-linear dead zone block 112 effectively cancels out input from the saturation function block 108 when the velocity limit is reached. In other words, the feedback loop of the integrator 96 facilitates avoiding the motor 22 from operating at a speed higher than would typically be desired for an inspection procedure.

The output of the first integrator 96 is a velocity reference signal 94. That signal is provided along a non-linear feedback path to a Ks gain block 114. The non-linear feedback gain block 114 specifies the dynamic behavior of the control module 90 responsive to larger changes in the input signal 95. The input to the gain block 114 is from a multiplier 116 that has the velocity reference signal 94 as one input and an output from an absolute value block 118 as another input. The gain block 114 provides a time optimal phase trajectory for a second order system with a limit function such as the saturation function block 108. The gain Ks is calculated, based on a desirable limit of the velocity rate, for example.

The output signal 94 provides a speed reference that governs the speed of operation of the motor 22 during an inspection procedure. The speed reference signal 94 is provided to a summer 120 that combines the speed reference signal 94 (i.e., the commanded motor speed) with motor speed feedback signals 38' derived from the position sensor 38. The position reference signal 92 is provided to a summer 122 that combines the commanded position with an actual engine position signal 39' from the position sensor 39, for example. The position control module 42 of the controller 40 may modify or otherwise process the sensor signals before they are provided to the summers 120 and 122.

The outputs from the summers 120 and 122 are error signals indicating differences between the commanded motor speed and the actual motor speed and the difference between the commanded motor position and the actual motor position, respectively. Regulators 124 and 126, which in one example are proportional integral regulators, receive the error signals from the summers 120 and 122, respectively.

Another summer 128 combines the error signals and provides them to a saturation function block 130 which has an output signal 132 that provides the torque reference to the torque control module 44. In this example, the signal 132 maintains the rotor position in a closed loop such that it holds the position value or moves the motor position very slowly. The torque reference signal 132, in this example, provides a positive torque value when the commanded position and the actual position do not match. The torque reference signal 132 provides an indication of the torque needed to move the engine to rotate the turbine blades, for example, to the desired position as indicated by an individual using the inspection interface 60, for example.

Figure 6:
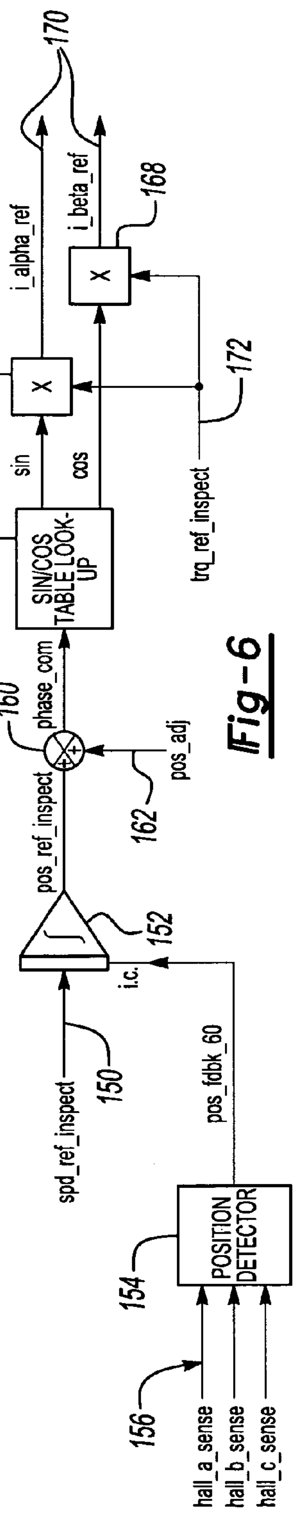
FIG. 6 schematically illustrates selected portions of another motor controller embodiment.

FIG. 6 schematically illustrates another strategy for utilizing the motor controller 40 during an inspection procedure. The embodiment of FIG. 6 is particularly useful for arrangements that include a motor 22 that does not have a large cogging torque. The technician or mechanic provides a speed reference input signal 150 using the interface 60 that indicates the rate of position change desired for moving the engine 24 during an inspection procedure. When the engine should be stopped during an inspection, the speed reference input signal may have a zero value, for example.

An integrator 152 provides a tooth wave output based upon the speed reference input signal 150. The frequency of the signal provided by the integrator 152 corresponds to the rate of position change indicated by the input signal 150. In this example, the integrator 152 is initialized by the output of a position detector 154 that receives input signals 156 from the position sensor 38. The position detector 154 provides the initialization signal to the integrator 152 that operates as a confirmation that the motor is moving in an expected direction. This initialization feature protects against the motor moving backward responsive to the command signal 150, which provides protection to the clutch arrangement 36.

In another example, the integrator 152 does not require initialization by any position sensor.

In one example, the integrator 152 is a modular $2\pi$ integrator and, therefore, the tooth wave output provided to a summer 160 has a frequency that corresponds to the desired motor speed. A position adjustment signal 162 is provided to the summer 160 in this example for fine tuning the position of the motor and, therefore, the portion of the engine currently under inspection. Such a fine tuning adjustment feature allows an individual to obtain the best possible view of a selected engine component during inspection.

The output of the summer 160 is provided to a sin/cos look up table 164. Resulting quadrature signals are provided to multipliers 166 and 168. The output of the multipliers are current reference signals 170 that are processed by the torque control module 44 to generate motor control commands. In this example, a torque reference signal 172 is also provided to the multipliers 166 and 168. In one example, the torque reference signal 172 is set manually.

By utilizing the motor controller 40 in an inspection mode and using the motor 22 that is otherwise used for starting the engine 24, the disclosed embodiments provide a unique inspection arrangement that facilitates more efficient and more convenient turbine engine inspection.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A turbine engine inspection system, comprising;

an electric motor associated with the turbine engine for starting the engine;

a motor controller that operates in a first mode for controlling movement of the motor at least for starting the engine; and an inspection interface that is manually controllable and that communicates with the motor controller to cause the motor controller to operate in a second, different mode for moving the motor in a manner that results in movement of portions of the engine for inspecting the engine.

2. The system of claim 1, wherein the inspection interface comprises a transmitter that transmits at least one wireless signal and the motor controller includes a receiver that receives the wireless signal from the inspection interface such that the motor controller is responsive to the received signal.

3. The system of claim 2, wherein the inspection interface generates at least one of a position signal indicative of a desired position of the portion of the engine to be inspected or a speed signal indicative of a desired speed with which to move the portion of the engine to be inspected.

4. The system of claim 1, wherein the motor controller includes an input port that is adapted to be selectively coupled to the inspection interface and wherein the motor controller receives at least one signal from the inspection interface through the input port indicating a desired motor operation to facilitate inspection.

5. The system of claim 1, wherein the motor controller includes a command generator that is responsive to an input position reference signal from the inspection interface, the command generator providing a motor velocity reference signal and an engine position reference signal responsive to the input position reference signal.

6. The system of claim 5, wherein the command generator includes a torque control portion that provides a motor torque reference signal based upon at least one of a difference between the velocity reference signal and a current motor velocity and a difference between the position reference signal and a current engine position.

7. The system of claim 6, wherein the torque control portion operates to hold the motor and the engine in a current position when the motor position and motor velocity correspond to the input position reference signal.

8. The system of claim 6, including a low resolution position sensor associated with the motor that provides a square wave sensor signal to the motor controller indicating a position of the motor and a position sensor associated with the engine that provides an indication of a selected portion of the engine.

9. The system of claim 8, wherein the position sensor associated with the engine comprises a sensor that detects a position of an engine shaft.

10. The system of claim 5, wherein the inspection interface includes at least one input device that is manually controllable for generating a selected input position reference signal.

11. The system of claim 1, wherein the controller includes a motor control signal generator that receives an inspection speed reference signal from the inspection interface and converts the inspection speed reference signal into a sinusoidal motor control wave form.

12. The system of claim 11, wherein the inspection interface includes at least one input device that is manually controllable for generating a selected inspection speed reference signal.

13. The system of claim 1, wherein the electric motor moves at a first speed for starting the engine and a second, lower speed for inspecting the engine.

14. The system of claim 1, including an input port adapted to be manually connected with the inspection interface and wherein the motor controller automatically switches into an inspection mode responsive to a connection with the inspection interface.

15. The system of claim 1, wherein the motor controller controls movement of the motor for inspecting the engine in a manner that includes selectively using the motor to move the engine into a desired position and holding the engine in the desired position.

16. The system of claim 1, wherein the inspection interface communicates with the motor controller to indicate a desired movement of the motor that moves the portions of the engine at a speed to facilitate manual, visual inspection of the portions of the engine.

17. A method of inspecting a turbine engine using a motor controller that operates in a first starting mode for starting the engine, comprising:

communicating a desired engine position to the motor controller operating in a second, different inspecting mode for inspecting the engine; and moving the motor using the motor controller responsive to the communicated desired engine position to thereby move a portion of the engine.

18. The method of claim 17, including manually manipulating an input device to thereby generate at least one signal indicative of the desired engine position.

19. The method of claim 17, including wirelessly communicating with the motor controller.

20. The method of claim 17, including:

generating a motor velocity reference signal responsive to the communicated desired engine position;

generating an engine position reference signal responsive to the communicated desired engine position;

determining if there is a first difference between a motor velocity corresponding to the velocity reference signal and a current motor velocity;

determining if there is a second difference between an engine position corresponding to the engine position reference signal and a current engine position; and generating a torque command signal that causes movement of the motor responsive to determining that the first difference or the second difference exists.

21. The method of claim 20, including detecting a position of the motor and detecting a position of the engine.

22. The method of claim 17, including generating a sinusoidal motor control wave form responsive to an input speed reference signal that is indicative of a desired speed of movement of a portion of the engine.

23. The method of claim 22, including determining a position and direction of movement of the motor before generating the sinusoidal motor control wave form.

24. The method of claim 22, including maintaining the engine in a position responsive to a corresponding input speed reference signal and manually selecting an automatic adjustment of the engine position from the maintained position.

25. The method of claim 17, comprising controlling the motor to move the portion of the engine into the desired position and holding the portion of the engine in the desired position.

26. The method of claim 17, comprising using an inspection speed for moving the motor and the portion of the engine that is lower than a speed used for operational rotation of the engine.

27. The method of claim 17, comprising determining whether an inspection input device has been associated with the motor controller and automatically switching the motor controller into an inspection mode if the association has been made.

28. The method of claim 17, comprising moving the motor at a speed that moves the engine at a speed that facilitates manual, visual inspection of at least the portion of the engine.

* * * * *